United States Patent
Ishii

(10) Patent No.: US 11,568,521 B2
(45) Date of Patent: Jan. 31, 2023

(54) APPARATUS, METHOD THEREOF, AND RECORDING MEDIUM

(71) Applicant: CANON KABUSHIKI KAISHA, Tokyo (JP)

(72) Inventor: Hirokazu Ishii, Chofu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/872,081

(22) Filed: May 11, 2020

(65) Prior Publication Data

US 2020/0380645 A1 Dec. 3, 2020

(30) Foreign Application Priority Data

May 31, 2019 (JP) .............................. JP2019-102879

(51) Int. Cl.
*H04N 5/232* (2006.01)
*G06T 5/00* (2006.01)

(52) U.S. Cl.
CPC ......... *G06T 5/006* (2013.01); *H04N 5/23216* (2013.01); *H04N 5/23219* (2013.01); *H04N 5/232122* (2018.08); *H04N 5/232123* (2018.08); *H04N 5/232127* (2018.08)

(58) Field of Classification Search
None
See application file for complete search history.

(56) References Cited

U.S. PATENT DOCUMENTS

| | | | | |
|---|---|---|---|---|
| 2005/0264679 A1* | 12/2005 | Sasaki | ............... | H04N 5/23212 348/345 |
| 2009/0304301 A1* | 12/2009 | Hattori | ............. | H04N 5/232127 382/275 |
| 2010/0315526 A1* | 12/2010 | Nakano | .............. | H04N 5/23212 348/222.1 |
| 2015/0146010 A1* | 5/2015 | Yokozeki | ........... | H04N 5/23218 348/169 |
| 2017/0085779 A1* | 3/2017 | Miyatani | ............ | H04N 9/04557 |
| 2019/0260928 A1* | 8/2019 | Kunishige | .............. | G02B 13/06 |

FOREIGN PATENT DOCUMENTS

| JP | 2008118387 A | * | 5/2008 |
|---|---|---|---|
| JP | 4732303 B2 | | 7/2011 |

OTHER PUBLICATIONS

Title: Translation of JP 2008-118387A Author: Yoshihiro Honma (Year: 2008).*

* cited by examiner

*Primary Examiner* — Twyler L Haskins
*Assistant Examiner* — Wesley J Chiu
(74) *Attorney, Agent, or Firm* — Canon U.S.A., Inc. IP Division

(57) ABSTRACT

An apparatus includes a reference coordinate selection unit configured to select reference coordinates of two points from a focus frame area set by a setting unit, and determines arrangement intervals of focus frames based on coordinates on image data before correction corresponding to the coordinates selected by the reference coordinate selection unit and a number of focus frames.

12 Claims, 16 Drawing Sheets

PINCUSHION-SHAPE DISTORTION

BARREL-SHAPED DISTORTION

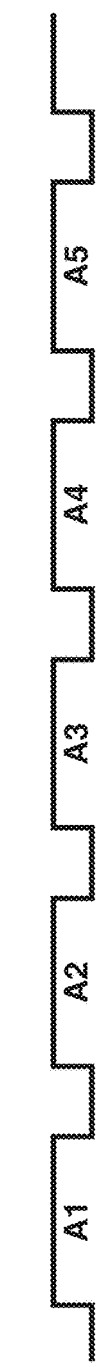
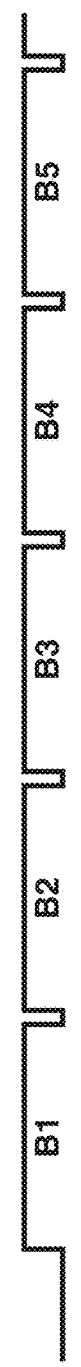
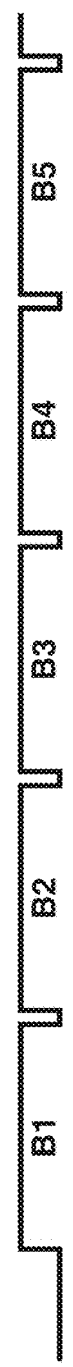
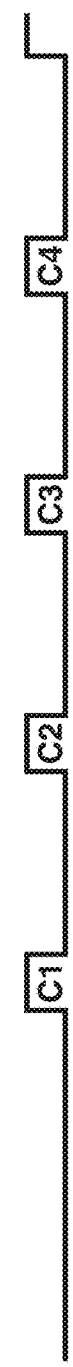
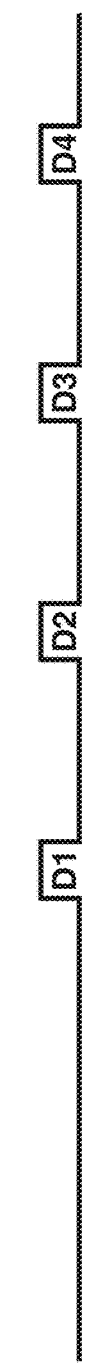
FIG. 4A OUTPUT OF A/D 12
FIG. 4B OUTPUT OF DEVELOPMENT PROCESSING UNIT 16
FIG. 4C INPUT OF DISTORTION CORRECTION UNIT 18
FIG. 4D INPUT OF FACE DETECTION UNIT 20
FIG. 4E OUTPUT OF FACE DETECTION UNIT 20
FIG. 4F OUTPUT OF REFERENCE COORDINATE SPECIFICATION UNIT 25
FIG. 4G OUTPUT OF REVERSE DISTORTION CORRECTION UNIT 26

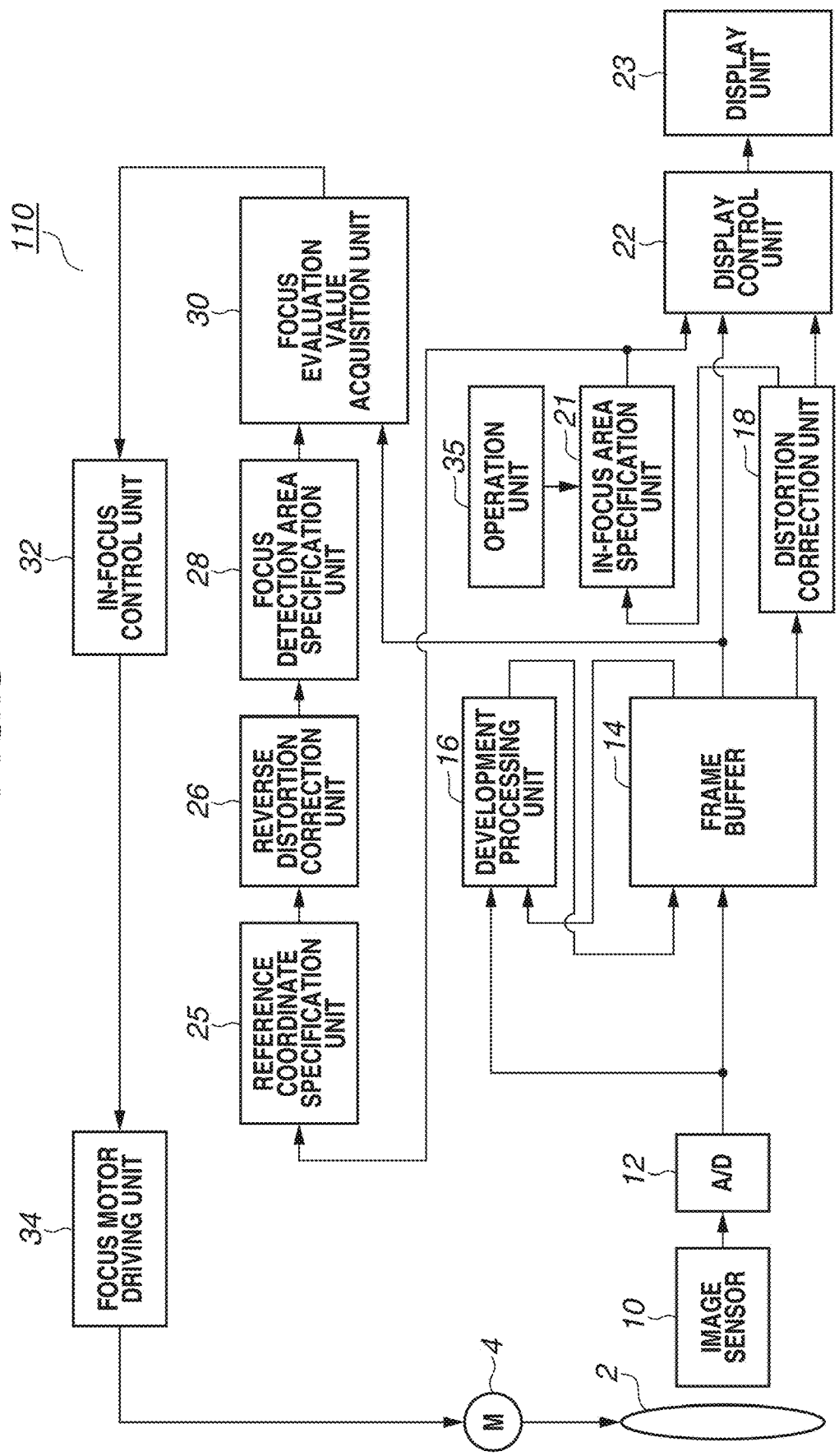

CORRECT EVALUATION VALUE IN FACE AREA OF IMAGE WITHOUT DISTORTION

EVALUATION VALUE WHEN FACE AREA IS DEVIATED BECAUSE OF DISTORTION

APPARATUS, METHOD THEREOF, AND RECORDING MEDIUM

BACKGROUND OF THE INVENTION

Field of the Invention

The aspect of the embodiments relates to a focus detection technique for an image capturing apparatus.

Description of the Related Art

A contrast detection auto-focus (AF) method and a phase difference AF method have been known as auto-focus detection methods of an image capturing apparatus. Both of the contrast detection AF method and the phase difference AF method are AF methods widely used in a video camera and a digital camera, and an image sensor may be used as a sensor for executing focus detection. Normally, focus detection is executed on a part of an area in a captured image.

According to a technique discussed in Japanese Patent No. 4732303, in a case where distortion caused by an optical system occurs in an image, reverse processing to distortion correction processing is executed on a position of a main object on a screen detected from a display image after distortion correction or specified by a user. Through the above-described method, deviation between a position of a focus frame in the display image and a position of an in-focus control area in the captured image can be reduced.

However, in the above-described conventional technique discussed in Japanese Patent No. 4732303, a setting method of a plurality of focus frames arranged thereon has not been taken into consideration. Therefore, a calculation amount can be increased remarkably, and the processing can become complicated in the recent trend where the number of focus frames and a size of the arrangement area thereof increase.

SUMMARY OF THE INVENTION

According to an aspect of the embodiments, a method of an apparatus including a capturing unit configured to convert an object image formed by an optical system into an image signal includes correcting optical distortion caused by the optical system reflected on image data before correction acquired from the image signal and outputting corrected image data, setting a focus frame area for detecting an in-focus state of the optical system based on the corrected image data, specifying a number of focus frames and arrangement of the focus frames with respect to the image data before correction according to the setting, and detecting an in-focus state of the optical system based on an image signal of an area specified by the specifying. The specifying further includes selecting reference coordinates of two points from the set focus frame area, and determining arrangement intervals of the focus frames based on coordinates on the image data before correction corresponding to the selected coordinates and the number of focus frames.

Further features of the disclosure will become apparent from the following description of exemplary embodiments with reference to the attached drawings.

BRIEF DESCRIPTION OF THE DRAWINGS

FIGS. 4A to 4G are timing charts illustrating operation timings of respective units of the digital camera according to the first exemplary embodiment.

FIG. 5 is a block diagram illustrating a configuration of a main portion of a digital camera as an example of an image capturing apparatus according to a second exemplary embodiment.

DESCRIPTION OF THE EMBODIMENTS

Figure 1:
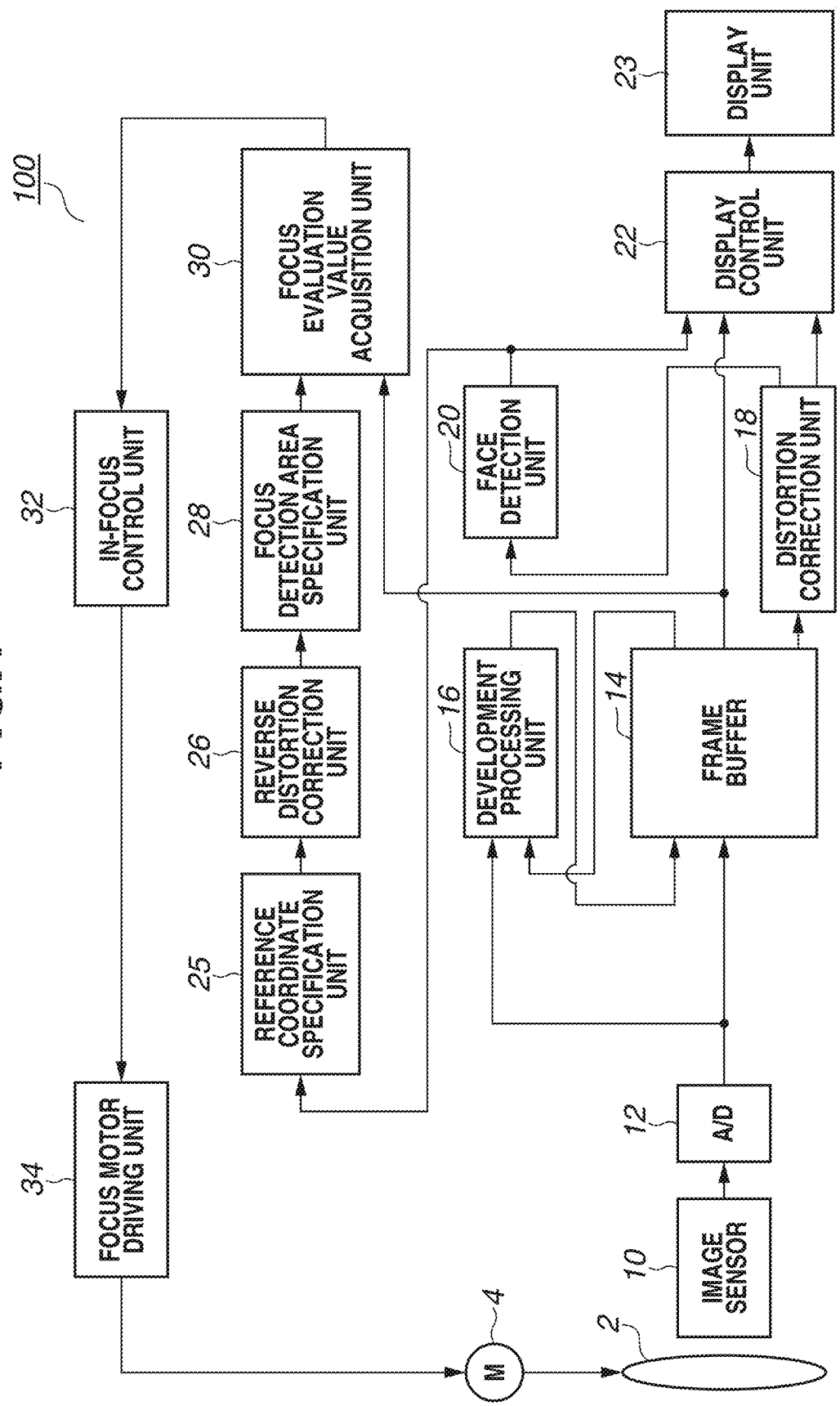
FIG. 1 is a block diagram illustrating a configuration of a main portion of a digital camera as an example of an image capturing apparatus according to a first exemplary embodiment.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Hereinafter, exemplary embodiments of the disclosure will be described in detail with reference to the appended drawings.

For example, there is a case where a user selects a face area of an object from images which are sequentially captured by an image capturing apparatus and displayed on a display screen, and executes in-focus control on the face area. In this case, the user can use the captured image as a display image without correcting distortion in a case where there is very little distortion caused by an optical system of the image capturing apparatus.

Accordingly, a position of a frame indicating the face area detected from the captured image appropriately corresponds to the face area in the display image. A frame displayed thereon to present to the user an area where in-focus control is executed is called a focus frame, and an area in the captured image corresponding to the focus frame, actually used for the in-focus control, is called as an in-focus control area (i.e., image signal area).

Figure 6:
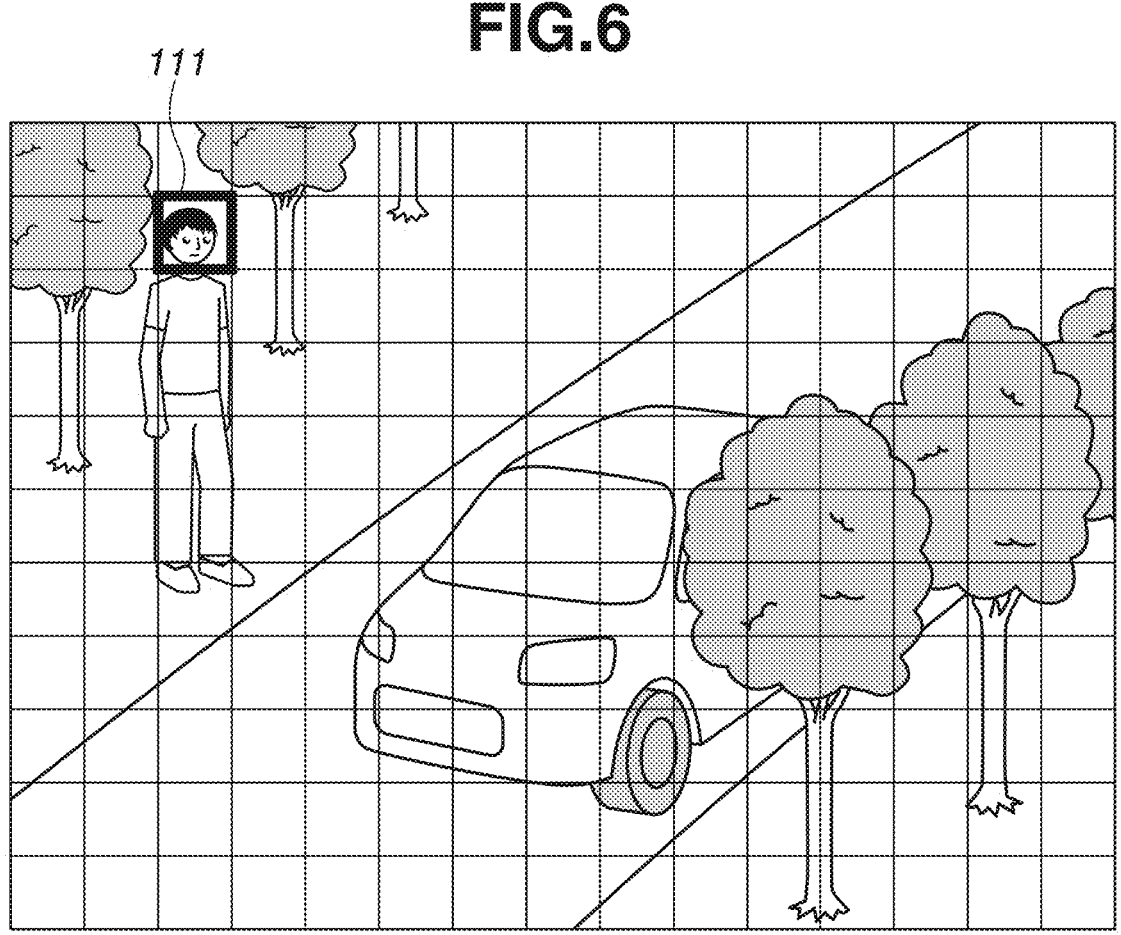
FIG. 6 is a diagram illustrating an example of a display image and a focus frame in a case where optical distortion is ignorable.

FIG. 6 is a diagram illustrating an example of an image and a focus frame displayed on a display screen. In a case where the distortion of the optical system is ignorable, the display image and the captured image approximately coincide with each other, so that the display image and the focus frame are in the relationship as illustrated in FIG. 6. In addition, a grid in the image in FIG. 6 is a line illustrating arrangement of several focus frames which could be displayed on the entire screen, and not all of the frames are displayed before in-focus control is executed.

In this case, a focus frame 111 is displayed at a position corresponding to the face area in the display image, and appropriately corresponds to the face area in the captured image as a source of the display image. This is a natural consequence because distortion is not corrected when the display image is generated from the captured image.

Figure 8A:
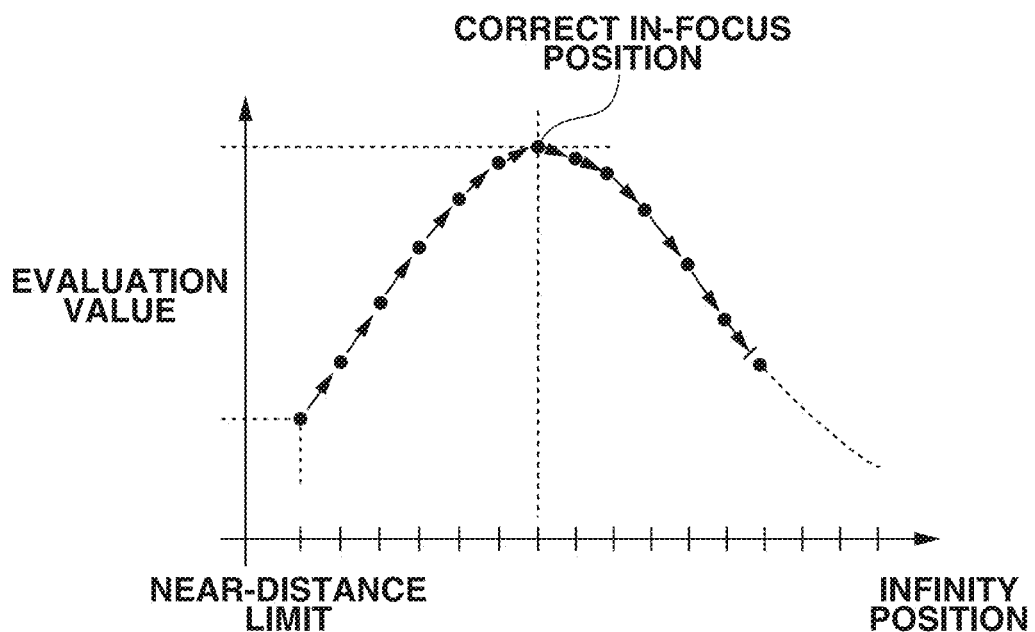
FIGS. 8A and 8B are graphs illustrating a difference between in-focus evaluation values in the states illustrated in FIGS. 6 and 7.

Because the focus frame 111 appropriately corresponds to the face area in the captured image, an evaluation value for achieving the in-focus state at a position of the object's face can be acquired through the in-focus control processing in the in-focus control area. The above-described state is illustrated in FIG. 8A.

Figure 7:
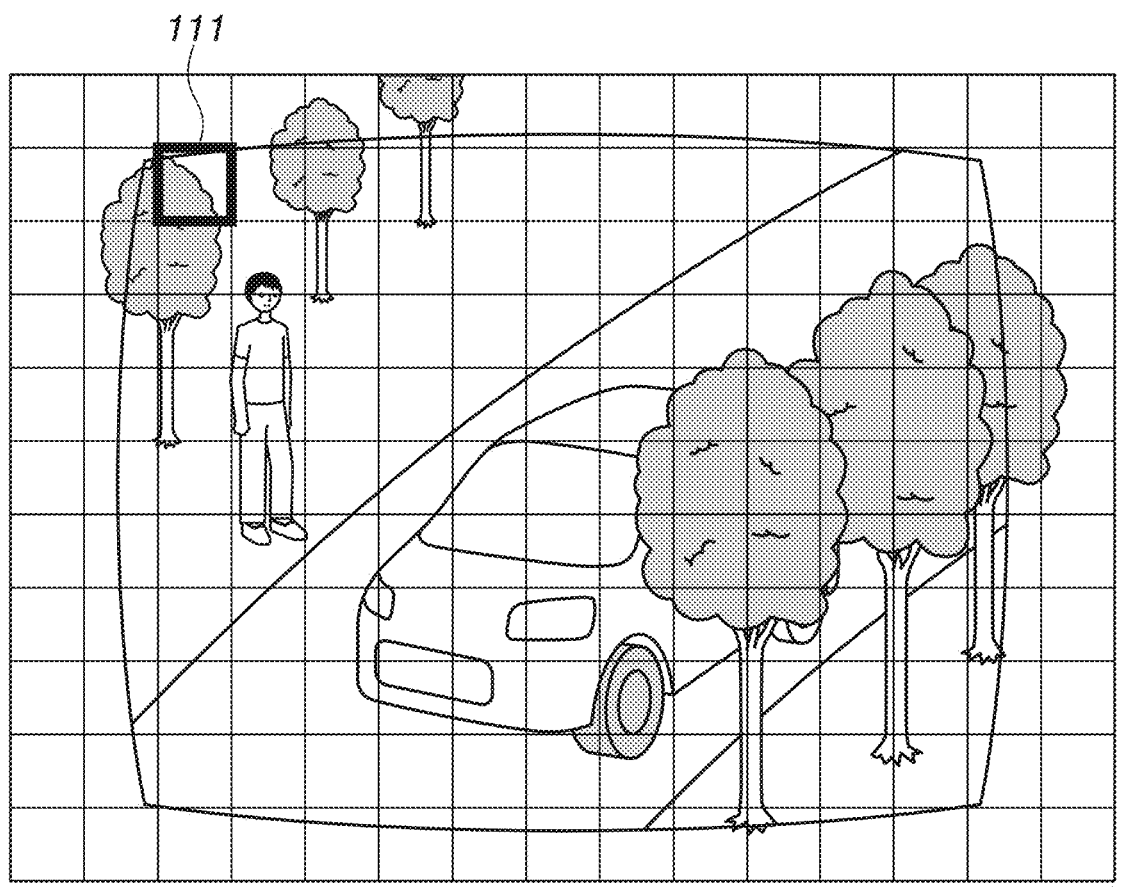
FIG. 7 is a diagram illustrating deviation between a face area in a captured image and a face area in a display image in a case where optical distortion is not ignorable.

Meanwhile, it is assumed that distortion occurs in the captured image due to the characteristic of the optical system, as illustrated in FIG. 7. In FIG. 7, occurrence of barrel-shaped distortion can be seen from deformation of a range frame in the display image. Because it is not desirable to display an image having such distortion that can be recognized instantaneously, the distortion is to be corrected when the display image is generated. Then, face detection processing and a user operation for specifying a focus frame position are executed based on the display image after distortion is corrected. As a result, even in a case where distortion occurs in the captured image, an image similar to the image in FIG. 6 is displayed, and the image is indistinguishable from the image in FIG. 6 by appearance. However, a relationship between the area indicated by the focus frame 111 and the in-focus control area is different from that of a case where distortion does not occur in the captured image.

In other words, the focus frame 111 corresponding to the face area in the display image after distortion correction is deviated from a position of the face area in the captured image with distortion by an amount corresponding to the distortion.

Figure 8B:
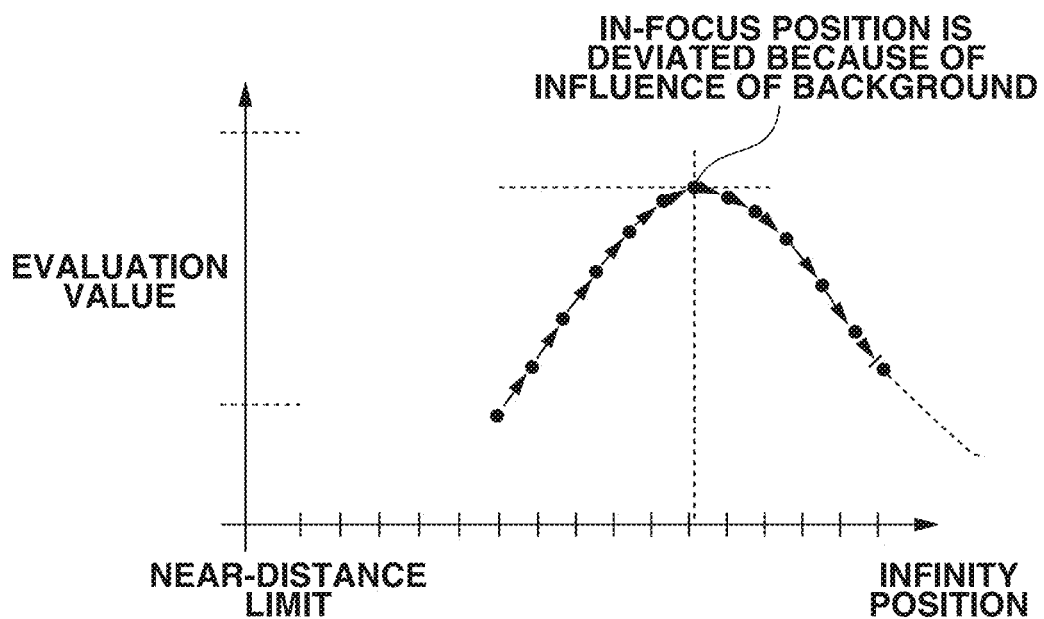

As a result, if the evaluation value of in-focus control is acquired by using an area in the captured image corresponding to the focus frame 111, in-focus control may be executed with respect to an object different from the face. For example, in the example illustrated in FIG. 7, a high-contrast object, such as a tree in a background, is included in an area in the captured image corresponding to the focus frame 111. Further, as illustrated in FIG. 7, in a case where the image of the object is large in height, an area that is not used as the actual display image may be included. In an extreme case, there is a possibility that an area outside the image circle corresponding to the lens is set as the in-focus control area. In FIG. 7, in-focus control is executed in such a state that a focal point is adjusted to the tree in the background instead of the face. FIG. 8B is an example of an in-focus evaluation value, illustrating a state where an evaluation value at a distance different from the distance to the face becomes high because of an influence of an image different from the face included in the in-focus control area.

An influence of distortion with respect to a limited area such as a face area at a position specified by the user has been described above. In recent years, there has been an improvement in the auto-focus techniques such as a servo AF technique which continuously adjusts a focal point to a moving object and a technique which automatically detects an object as an image-capturing target of the user from almost all of the area in the screen and adjusts a focal point thereto. In connection with the above-described improvement, there has been a demand for a technique for simultaneously processing a large number of focus frames arranged in a wide range of the screen. The same can be also said for a lens having a large amount of distortion, and auto-focusing can be executed precisely by minimizing deviation caused by distortion even if a plurality of focus frames is arranged in a wide range. However, because of increases in the number of focus frames and a size of the arrangement area thereof, a calculation amount is increased remarkably, and the processing becomes complicated.

Configuration of Image Capturing Apparatus

Hereinafter, a first exemplary embodiment will be described. The present exemplary embodiment will be described with respect to the case where the disclosure is applied to a digital compact camera as an example of an image capturing apparatus, which is integrally configured of a lens and a camera main body.

FIG. 1 is a block diagram illustrating a configuration of a main portions of a digital camera (image capturing apparatus) 100 according to the present exemplary embodiment.

In FIG. 1, an optical system 2 is configured of one or more lenses, and an object image is formed thereby. The optical system 2 also includes a focus lens used for executing auto-focus control. When light from the object passes through the optical system 2, optical distortion occurs in the object image because of aberration of the lens included in the optical system 2. As a response to a request from another component, the optical system 2 can supply information about a view angle or an aperture as lens information.

A motor 4 moves a focus lens of the optical system 2. For example, an image sensor 10 is a photoelectric conversion element having several thousand or million pixels. Generally, a charge coupled-device (CCD) sensor or a complementary metal-oxide semiconductor (CMOS) sensor is used as the image sensor 10. The image sensor 10 converts an object image formed by the optical system 2 into an electric signal (image signal) of a pixel unit. Although a peripheral component, such as a color filter or an optical low-pass filter, is normally arranged on the image sensor 10, description thereof will be omitted because it is not directly related to the aspect of the embodiments.

An analog image signal read out from the image sensor 10 is converted to digital image data by an analog-to-digital (A/D) conversion unit 12.

A frame buffer 14 includes a dynamic random access memory (DRAM) and a memory controller that executes reading/writing control of the DRAM. The frame buffer 14 is used for temporarily storing image data converted by the A/D conversion unit 12 and image data developed by the development processing unit 16 described below.

The development processing unit 16 executes development processing on digital image data converted by the A/D conversion unit 12 and digital image data stored in the frame buffer 14. Specifically, for example, the development processing unit 16 generates YUV data, which leads up to generation of a JPEG image data file generally used for the digital camera. The processing result is stored as captured image data in the frame buffer 14.

A distortion correction unit 18 corrects optical distortion occurring in an object image and captured image data because of aberration of the lens included in the optical system 2, and outputs image data (corrected image data) representing the object image without distortion. In the present exemplary embodiment, the distortion correction unit 18 corrects the optical distortion reflected on the image data by adjusting a reading method of image data stored in the frame buffer 14.

A face detection unit 20 executes face detection processing on the corrected image data output from the distortion correction unit 18 to detect an area of a human face (face area) included in the object. A face detection result acquired by the face detection unit 20 as the face area information (e.g., position information of the face area) is supplied to a display control unit 22 and a reference coordinate specification unit 25, and further supplied to a reverse distortion correction unit 26. Based on the face area information from the face detection unit 20, the display control unit 22 determines a focus frame indicating a face area in the corrected image data and generates display data of the focus frame. For example, the focus frame is a square-shaped frame that circumscribes the face area. Then, the display control unit 22 displays combined image data of image data read from the frame buffer 14 or corrected image data output from the distortion correction unit 18 and the focus frame on the display unit 23. In the present exemplary embodiment, for the sake of simplicity and easy understanding, corrected image data is always displayed thereon.

In addition, the face area detected by the face detection unit 20 does not always have to be an area including the entire face but may be an area including a part of the face. It is desirable that at least an area of the eyes be included if the area includes a part of the face.

A liquid crystal display is used as a display unit 23, for example. The display unit 23 displays a user interface for executing various settings of the digital camera 100, reproduces and displays a captured image, and functions as a live-view display screen. In addition, the display unit 23 may be an external apparatus such as a television receiving set or a display monitor.

In order to determine the arrangement intervals between the focus frames arranged in the periphery of a position where the face is detected, the reference coordinate specification unit 25 specifies the coordinates used for associating the images before and after distortion correction based on the face detection area detected by the face detection unit 20. A method for specifying the reference coordinates will be described below in detail.

Based on the reference coordinates specified by the reference coordinate specification unit 25, the reverse distortion correction unit 26 acquires positions of the focus frames in the captured image data before distortion correction which correspond to the positions of the focus frames in the periphery of the face area in the corrected image data. Information about the acquired positions of the focus frames is output to a focus detection area specification unit 28. Specifically, the reverse distortion correction unit 26 applies reverse processing to the processing executed by the distortion correction unit 18 to the reference coordinates output from the reference coordinate specification unit 25 to acquire corresponding coordinates in the captured image data before distortion correction.

Based on the information about the reference coordinates output from the reverse distortion correction unit 26 and the number of focus frames calculated at a time, the focus detection area specification unit 28 determines the arrangement of the focus frames in the captured image data which is used for executing in-focus control. Specifically, with respect to the image data in the YUV format output from the development processing unit 16, the focus detection area specification unit 28 specifies a frame interval and an area of the focus frame arranged in the periphery of the face area received from the reverse distortion correction unit 26 as the in-focus control area. Then, the focus detection area specification unit 28 outputs information about the specified in-focus control area (e.g., information about a position, an arrangement interval, and a size of the in-focus control area) to a focus evaluation value acquisition unit 30.

Based on the information about the in-focus control area supplied from the focus detection area specification unit 28, the focus evaluation value acquisition unit 30 acquires luminance (Y) component data corresponding to the in-focus control area from the development processing unit 16. Then, the focus evaluation value acquisition unit 30 calculates a focus evaluation value representing an in-focus state of the optical system from the luminance component data. The focus evaluation value is supplied to an in-focus control unit 32. The focus evaluation value acquisition unit 30 and the in-focus control unit 32 are collectively called as a focus detection unit.

The in-focus control unit 32 receives the evaluation value from the focus evaluation value acquisition unit 30 and controls the focus motor driving unit 34 to search for a position where the evaluation value becomes the maximum. The focus motor driving unit 34 controls the motor 4 according to an instruction from the in-focus control unit 32 to move the focus lens included in the optical system 2.

Operation of Distortion Correction Unit

Next, operation of the distortion correction unit 18 in the present exemplary embodiment will be described.

Figure 2A:
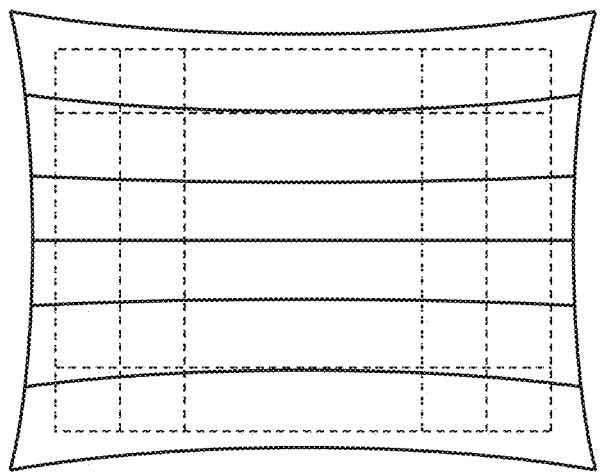
FIGS. 2A and 2B are diagrams illustrating pincushion-shaped distortion and barrel-shaped distortion as representative examples of optical distortion.
Figure 2B:
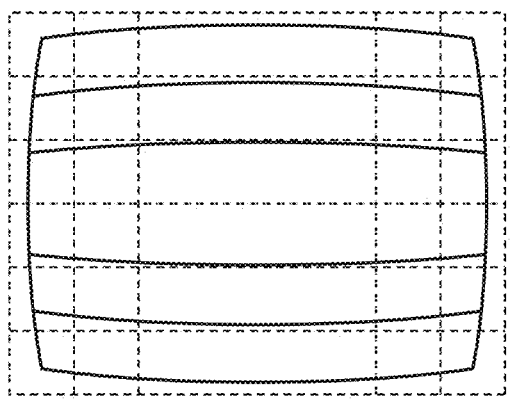

Optical distortion occurs in an object image formed through an optical lens because of aberration thereof. Because the image sensor directly converts the object image formed by the optical system 2 to an image signal, the image signal is also affected by the optical distortion occurring in the object image. Pincushion-shaped distortion in FIG. 2A and barrel-shaped distortion in FIG. 2B are given as representative examples of the optical distortion. In each of FIGS. 2A and 2B, an object image of a range expressed by a dotted line is formed into a shape expressed by a solid line because of the optical distortion.

For example, optical distortion of the object image can be corrected by converting the object image into digital data and rearranging the pixel data according to the distortion.

Figure 3:
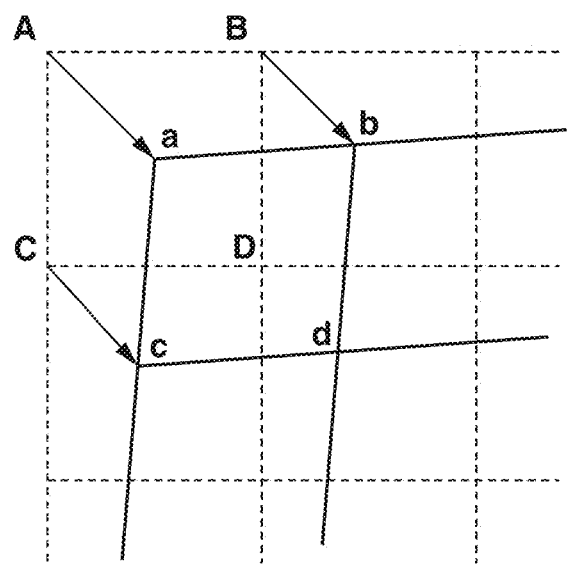
FIG. 3 is a diagram illustrating an example of a correction method of the barrel-shaped distortion.

For example, a case where the image having the barrel-shaped distortion as illustrated in FIG. 3 is corrected will be considered. FIG. 3 illustrates a state where an object image to be formed at a portion expressed by points A to D is formed at a portion expressed by points a to d due to distortion. In this case, a distorted object image expressed by a solid line is converted into digital image data by the A/D conversion unit 12 and temporarily stored in the frame buffer 14.

When a corrected image is generated, the distortion correction unit 18 reads out a pixel at the point a as a pixel at the point A based on the data which describes a relationship between the coordinates (addresses) before and after conversion stored previously. Similarly, the distortion correction unit 18 reads out pixels at the points b, c, and d as the points B, C, and D, respectively. With this method, a distortion-corrected image can be generated. Further, if the number of pixels in a range between the points A to B is different from the actual number of pixels in a range between the points a to b, the number of pixels can be adjusted by interpolating or thinning out the pixels. Herein, the above-described data which describes a relationship between the coordinates is data based on an image height, a focus position, and a zoom position. The present exemplary embodiment has been described with respect to the case where a digital compact camera integrally configured of a lens and a camera main body is used as an example of an image capturing apparatus. However, the aspect of the embodiments is also applicable to an interchangeable single-lens reflex camera including a lens unit and a camera main body. The lens unit is mounted on the camera main body via a mount. In a case where the aspect of the embodiments is applied to an interchangeable single-lens reflex camera, the above-described data which describes a relationship between the coordinates is stored in the lens unit. Then, when the lens unit is mounted on the camera main body, the data is transmitted to and stored in the camera main body, so that the data is used when focus detection is executed.

Operation of Face Detection Unit

Operations of the face detection unit 20 will be described.

In the present exemplary embodiment, a known face detection technique can be used for detecting a human face area. Specifically, as a method for executing face detection processing, for example, there is a method in which a skin color area is extracted based on gradation colors of respective pixels represented by image data, and the face is detected based on a level of conformity with a face contour plate prepared previously. There is also a conventional method in which face detection is executed by extracting feature points such as the eyes, the nose, and the mouth using a known pattern recognition technique.

In the present exemplary embodiment, the face detection unit 20 previously stores a standard pattern of the human face. Then, the face detection unit 20 executes pattern matching between captured image data stored in the DRAM of the frame buffer 14 or corrected image data output by the distortion correction unit 18 and the standard pattern, and determines whether the human face is included in the image data. In a case where an area (face area) determined to be the human face is detected, the face detection unit 20 outputs the information about each face area to the display control unit 22 and the focus detection area specification unit 28. The information about the face area may be optional information, such as a coordinate value that specifies a minimum square-shaped area circumscribed to the face area, which allows the display control unit 22 and the focus detection area specification unit 28 to specify the face area.

Operation of Reverse Distortion Correction Unit

The operations of the reverse distortion correction unit 26 will be described.

The reverse distortion correction unit 26 executes the reverse processing to the processing executed by the distortion correction unit 18 for correcting distortion caused by the optical system 2. For example, if the dotted line in FIG. 3 expresses the image after distortion correction, processing for converting the image to the image before distortion correction (i.e., image without distortion correction) expressed by the solid line (reverse conversion) is executed. Accordingly, the points A to D are respectively converted to the points a to d.

In addition, the distortion correction unit 18 executes the correction processing on the entirety of the captured image data. Therefore, the reverse distortion correction unit 26 is different from the distortion correction unit 18 in that the correction processing is executed with respect to only the points in the entire corrected image data that correspond to the coordinate information output from the reference coordinate specification unit 25. Accordingly, a processing load thereof is small, and the correction processing can be executed within a short period of time even if a plurality of face areas is detected.

The reverse distortion correction unit 26 may store information about correction executed by the distortion correction unit 18 (i.e., information indicating a coordinate relationship) and execute reverse conversion by using the information. Further, distortion characteristics of the optical system 2 (information about type of occurring distortion instead of coordinate information) may be stored in advance, so that distortion characteristics corresponding to an image-capturing condition may be used.

As described above, the reverse distortion correction unit 26 acquires information about the coordinates in the captured image data before correction, specified by the reference coordinate specification unit 25, which corresponds to the position described in the face area information output from the face detection unit 20. Then, the reverse distortion correction unit 26 outputs the face area information which allows specification of the position and the size of the face area to the focus detection area specification unit 28.

Setting of Arrangement Interval of In-Focus Control Area

Generally, the user checks and determines whether in-focus control is executed on a desired object based on a positional relationship between an in-focus display and the object displayed on a live-view display screen. Therefore, deviation between positions of the focus frames displayed on the live-view display screen and the in-focus control areas on the captured image where in-focus control is executed is always reduced to the minimum. At the same time, by maintaining a real-time display characteristic, an image-capturing result as intended by the user can be provided.

In order to eliminate deviation between a position of the focus frame in the display image and the in-focus control area in the captured image, use of image data after distortion correction can be also considered when in-focus control is executed. However, use of such a distortion-corrected image data in the in-focus control is undesirable because of the following reasons. First of all, when distortion correction is executed, a high frequency component that is important for acquiring the evaluation value of in-focus control can be lost, so that in-focus accuracy is lowered. With respect to the above point, according to the conventional technique, deviation between the position of the focus frame in the display image and the position of the in-focus control area in the captured image can be reduced by applying the reverse processing to the distortion correction processing to the focus frame.

However, if the number of focus frames and a size of the arrangement area of the focus frames are increased, a calculation amount is increased remarkably, and the processing becomes complicated. This may cause a processing delay which can lead to difficulty with maintaining a real-time display characteristic.

Figure 10:
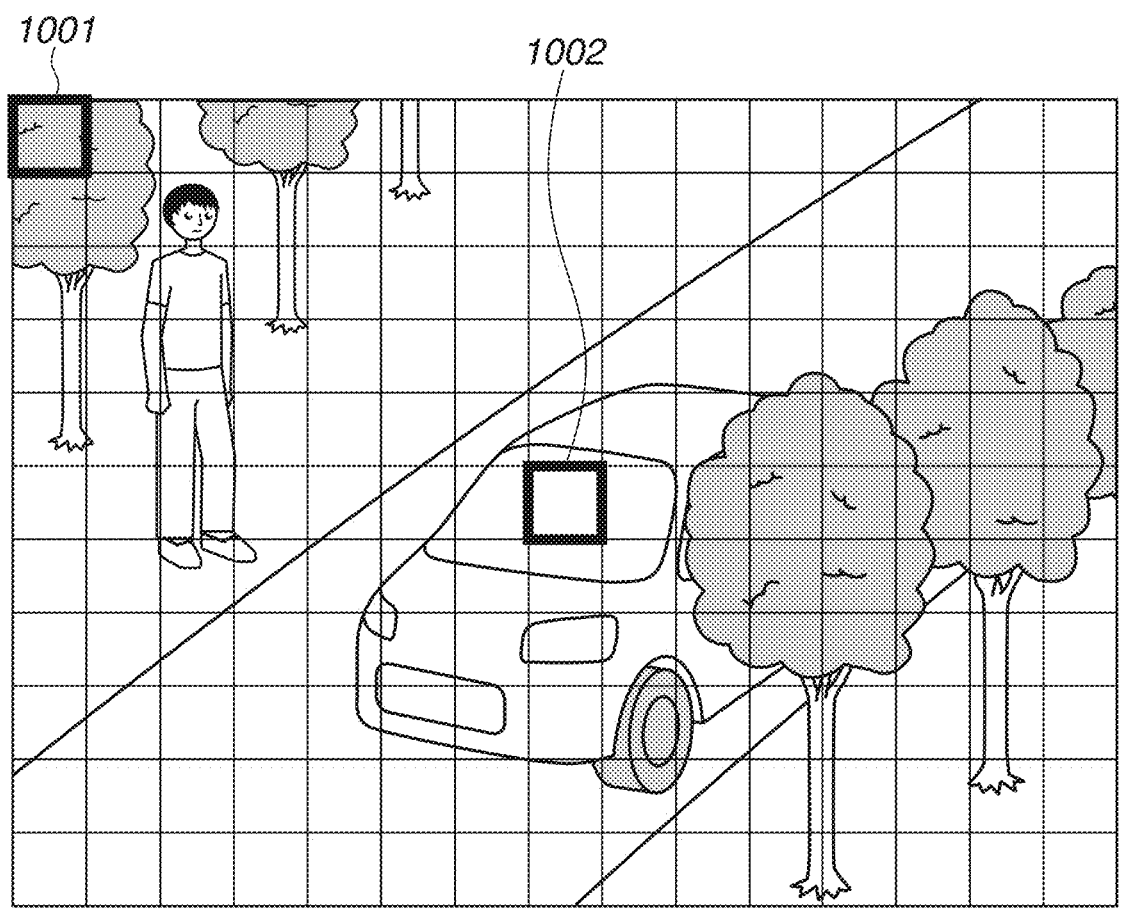
FIG. 10 is a diagram illustrating examples of a display image and reference points in a case where optical distortion is not ignorable.
Figure 11:
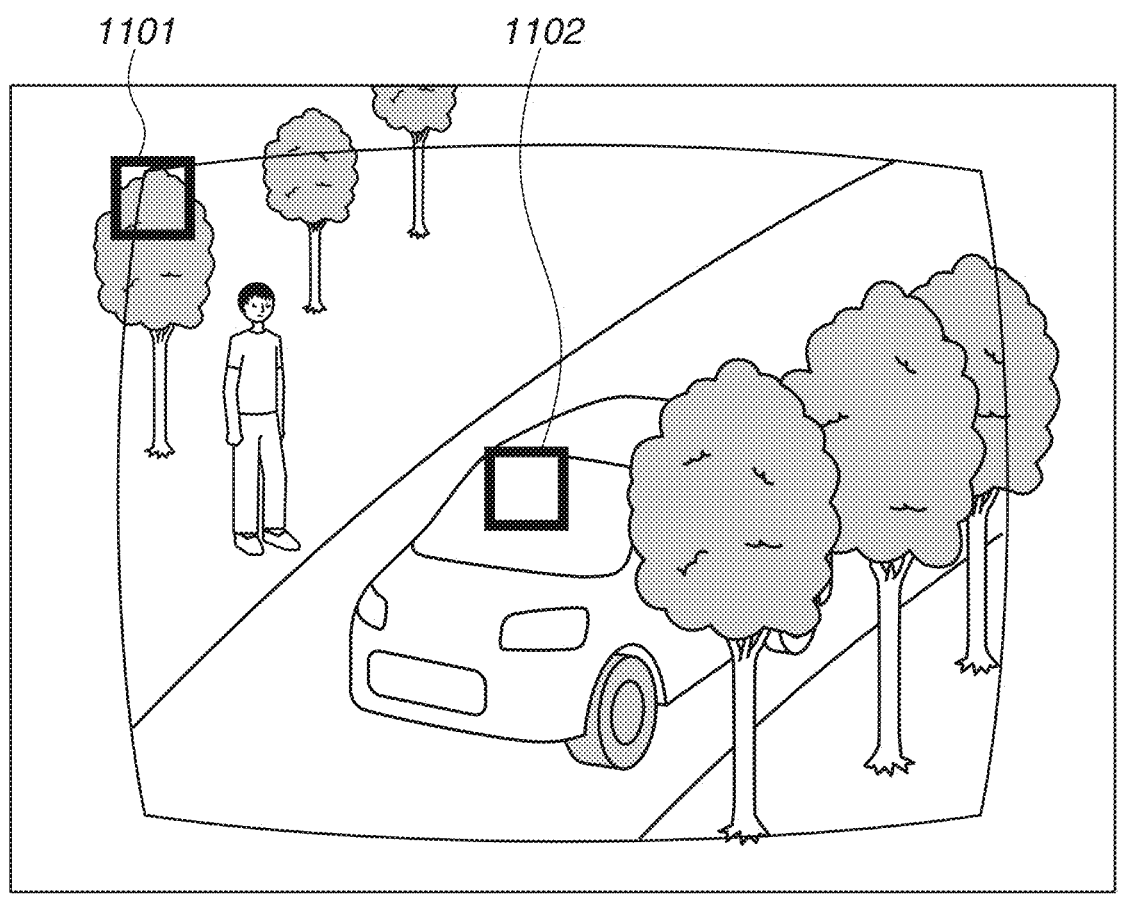
FIG. 11 is a diagram illustrating a relationship between reference points in a captured image in a case where optical distortion is not ignorable.
Figure 12:
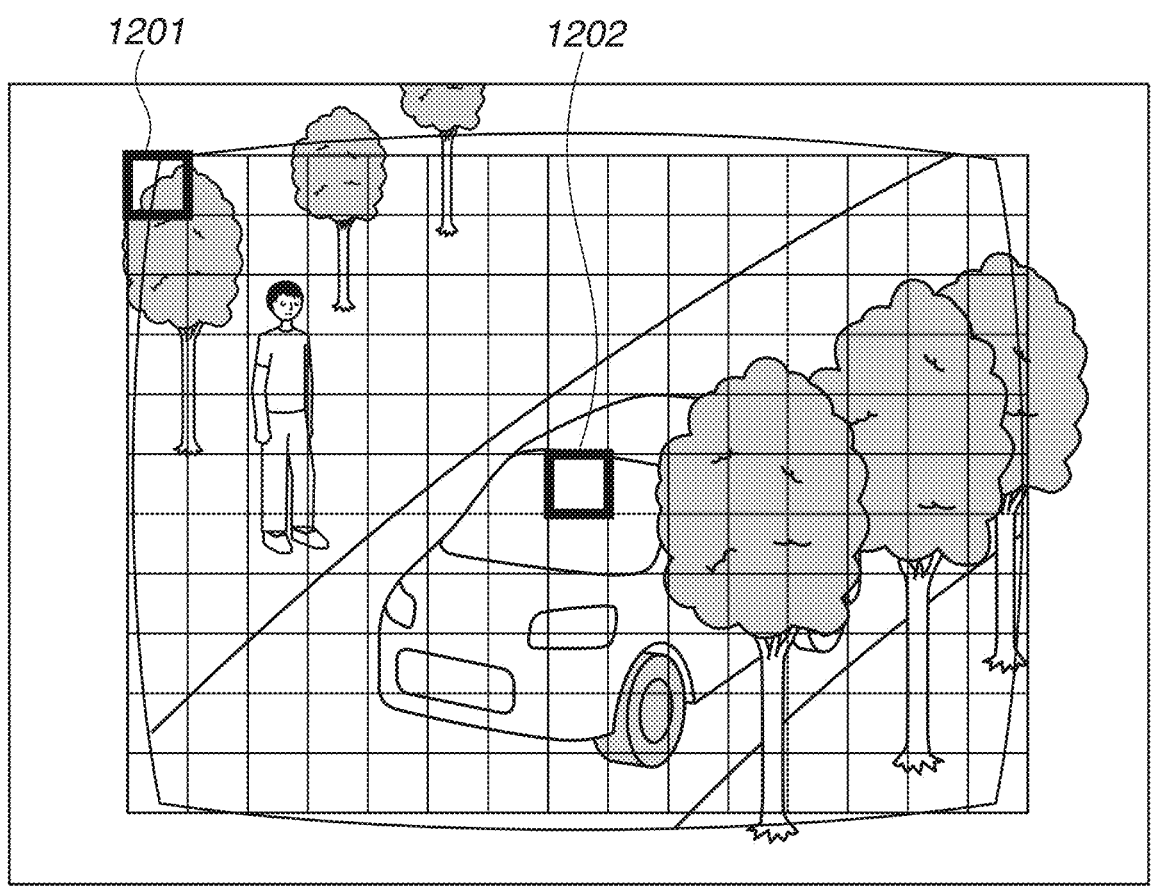
FIG. 12 is a diagram illustrating an arrangement relationship between reference points and in-focus control areas in a captured image in a case where optical distortion is not ignorable.

Therefore, in the present exemplary embodiment, the focus frames continuously arranged in a grid-like state are targeted, and arrangement intervals of the in-focus control areas are appropriately set through comparatively simple processing. With this configuration, both of reduction of deviation between the focus frame and the in-focus control area and maintenance of the real-time display characteristic can be achieved, and in-focus control and display processing can be executed according to the intention of the user. Specifically, it takes into account reduction of deviation between the areas by appropriately setting the arrangement intervals of the in-focus control areas based on the positions and the number of focus frames set by the user or automatically determined by the camera in the display image and an amount of distortion at a position of each of the focus frames. Two reference points for determining the arrangement interval between the in-focus control areas are selected from the arrangement area of the focus frames set on the display image. Specifically, two characteristic points, e.g., a point having the greatest distortion amount and a point having the smallest distortion amount in the arrangement area in the display screen may be selected as the reference points. A method for selecting the two reference points is not limited to the above, and any characteristic point in the arrangement area of the focus frames, e.g., a frame including central coordinates of a main object, a central frame in the arrangement area, points where deviation caused by distortion become maximum in positively and negatively opposite directions, can be applied thereto. Next, coordinates in the image data before distortion correction are acquired by executing the reverse processing to the distortion correction processing based on the distortion amounts at the two reference points. The reverse processing to the distortion correction processing has been described as the above. FIG. 10 is a diagram illustrating an example of a display image in a state where a plurality of focus frames is set to the entire screen. In FIG. 10, a focus frame 1001 represents a focus frame set as a reference point having a maximum distortion amount, and a focus frame 1002 represents a focus frame set as a reference point having a minimum distortion amount. On the other hand, FIG. 11 is a diagram illustrating a captured image before distortion correction, and in-focus control areas 1101 and 1102 in FIG. 11 are points in the captured image acquired by executing the reverse processing to the distortion correction processing executed on the reference points (focus frames) 1001 and 1002 in FIG. 10. FIG. 12 is a diagram illustrating a state where the in-focus control areas are arranged at regular intervals based on the converted reference points on the captured image in FIG. 11 and the number of frames set by the user or automatically set by the camera. In FIG. 12, at the two reference points, there is no deviation between the object images in the display image and the captured image, and arrangement intervals of the in-focus control areas are determined such that the in-focus control areas are regularly arranged based on the relationship between the coordinates of two points and the number of frames arranged between the two points. Thus, in the in-focus control areas having the image heights different from the image heights at the two points as references, deviation occurs between the focus frames and the in-focus control areas. However, while reducing the average deviation amount in the entire screen, the in-focus control areas can be controlled not to be set in areas that are not used in the display image. In FIGS. 10 to 12, although the description has been given with respect to the case where the in-focus control areas are arranged on the entire screen, a similar method is also applicable in a case where a plurality of focus frames is arranged based on a result of face detection.

Figure 13:
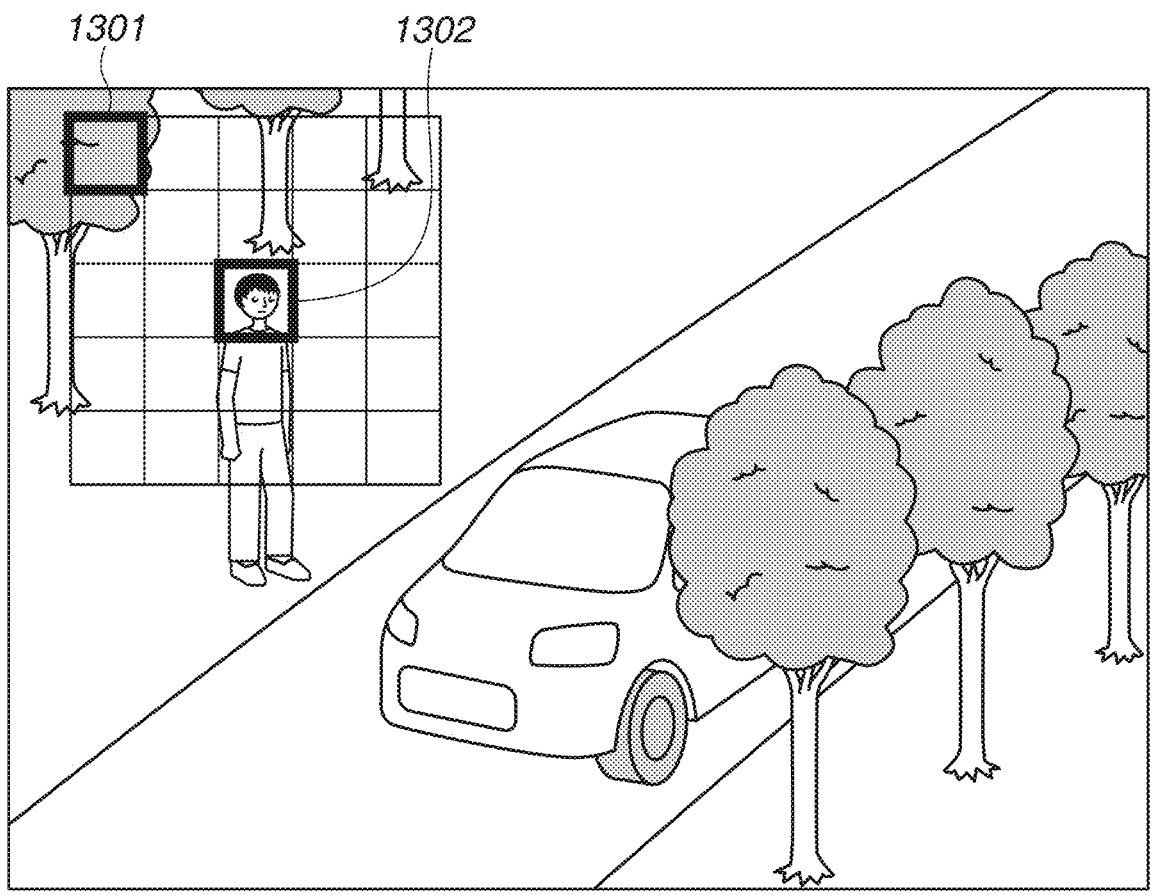
FIG. 13 is a diagram illustrating examples of a display image, reference points, and a face area when optical distortion is not ignorable.
Figure 14:
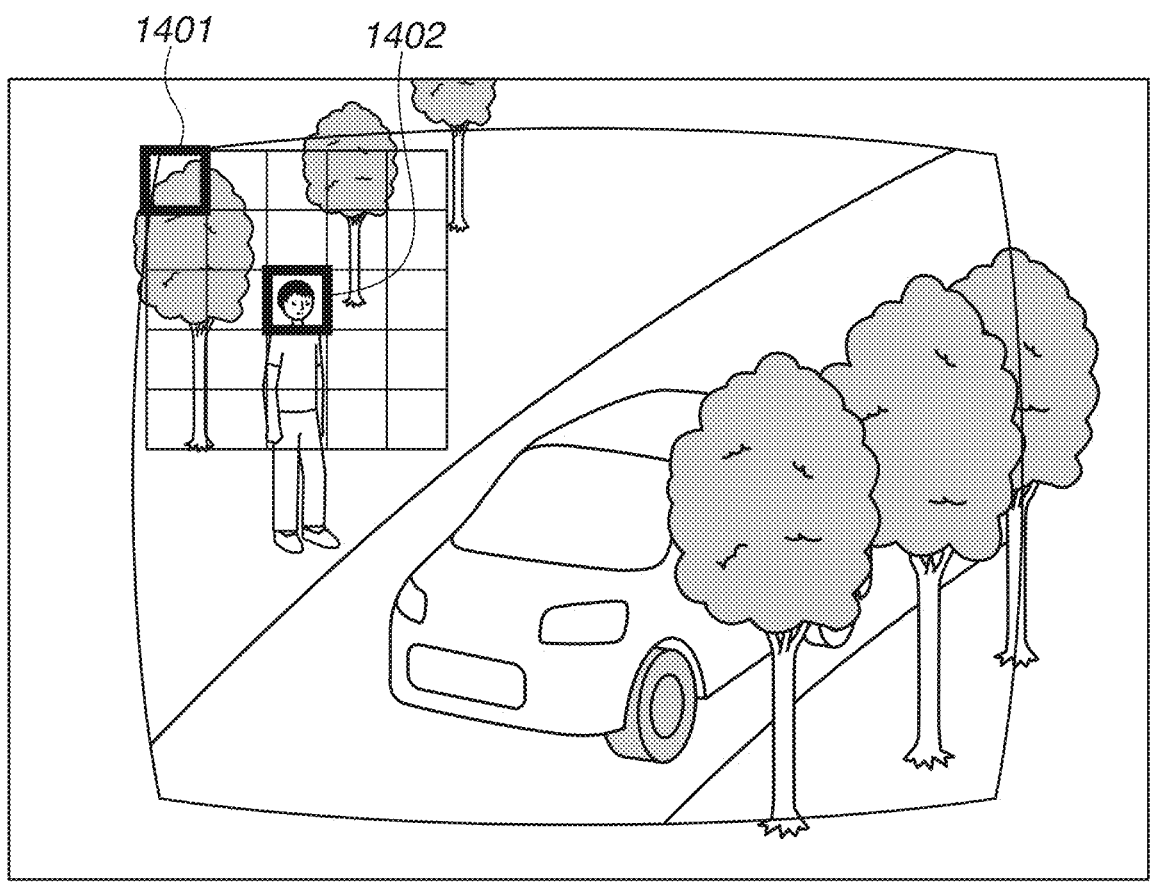
FIG. 14 is a diagram illustrating an arrangement relationship between reference points and in-focus control areas in a captured image in a case where optical distortion is not ignorable.

In FIG. 13, an arrangement method of the in-focus control areas when the face is detected by the face detection unit 20 will be described. Differing from the case where, as described above, a focus state is detected in the entire screen in a state where a main object is not determined, a setting method of the reference point is changed when a main object such as a face is determined. In this case, it is desirable that the center of the main object and the center of the in-focus control area in the captured image conform to each other, so that the reference point is set in such a state that both of the focus frame in the display image and the in-focus control area in the captured image conform to the detected face position. FIG. 13 is a diagram illustrating a state where five-by-five focus frames which include a face position detected in the display image and its peripheral positions around the face position. In FIG. 13, a focus frame 1301 represents a reference point having the greatest distortion amount within the arrangement area of the focus frames, and a focus frame 1302 represents a reference point that includes a detected face position. FIG. 14 is a diagram illustrating the captured image before distortion correction. In-focus control areas 1401 and 1402 are points in the captured image acquired by executing the reverse processing to the distortion correction processing on the reference points (focus frames) 1301 and 1302 in FIG. 13. FIG. 14 is a diagram illustrating a state where the in-focus control areas are arranged at regular intervals based on the converted reference points on the image-capturing screen in FIG. 13 and the number of frames previously determined when face detection is executed. The in-focus control areas are arranged as illustrated in FIG. 14.

Herein, because the face detection processing with respect to the image data after distortion correction is the processing for displaying the focus frames, a load of the face detection processing will not be increased. Further, because the reverse distortion correction processing is executed with respect to only the reference coordinates, the processing load will be small even when arrangement of the plurality of focus frames is determined. Thus, the processing can be executed rapidly, and in-focus control can be executed with sufficient followability even if movement of the face area is large.

By simply determining the arrangement interval of the in-focus control area in the above-described method, both of reduction of deviation between the focus frame and the in-focus control area and maintenance of the real-time display characteristic can be achieved, and in-focus control and display processing can be executed according to the intention of the user.

Operation Timing

FIGS. 4A to 4G are timing charts illustrating operation timings of respective units of the digital camera 100.

FIG. 4A illustrates a timing chart of digital image data output by the A/D conversion unit 12. The digital image data has a frame rate of 30 fps (i.e., an interval of approximately 33 msec.) in order to cause the display unit 23 to function as a live-view image display screen. FIG. 4B illustrates a timing at which digital image data output by the A/D conversion unit 12 and then developed by the development processing unit 16 is output as a development result (captured image data). The captured image data is output later than the digital image data with a time lag corresponding to a time taken to execute the development processing. As described above, the captured image data is temporarily stored in the frame buffer 14.

FIG. 4C illustrates a timing of distortion correction processing executed by the distortion correction unit 18 after the captured image data is stored in the frame buffer 14. As illustrated in FIG. 4C, the distortion correction unit 18 starts reading out the captured image and generates distortion correction data when a certain amount of captured image data (herein, approximately half of the image data amount) is stored in the frame buffer 14.

FIG. 4D illustrates the output of the distortion correction unit 18, i.e., an input timing of the face detection unit 20. Although it takes time to complete the distortion correction processing because of the large processing loads, there is almost no time lag between the input timing and the output timing.

FIG. 4E illustrates an output timing of the face detection unit 20. FIG. 4F illustrates an output timing of the reference coordinate specification unit 25. FIG. 4G illustrates an output timing of the reverse distortion correction unit 26.

As illustrated in FIGS. 4A to 4G, the reverse distortion correction unit 26 completes the output with respect to the image data of the first frame at a timing when image data of the third frame starts to be output. The focus evaluation value acquisition unit 30 acquires the evaluation value by using the image data conforming to the output timing of the reverse distortion correction unit 26, used as a source of the in-focus control area supplied from the focus detection area specification unit 28. Accordingly, in the example illustrated in FIGS. 4A to 4G, the frame buffer 14 desirably has a capacity for temporarily storing image data corresponding to at least three frames.

As described above, although a time lag corresponding to several frames occurs before acquisition of the evaluation value for in-focus control is started, in-focus control areas can be specified with respect to images of respective frames, and in-focus control can be executed with sufficient followability even if movement of the object is large.

As described above, according to the present exemplary embodiment, reverse distortion correction is executed with respect to the coordinates of two reference points selected from the area detected or specified from the image data after distortion correction, and arrangement of the focus frames used for in-focus control is determined based on the number of focus frames. With this configuration, both of reduction of deviation between the focus frame and the in-focus control area and maintenance of the real-time display characteristic can be achieved, and in-focus control and display processing can be executed according to the intention of the user by simply determining the arrangement interval of the in-focus control area even in a case where optical distortion occurs in the object image.

Configuration of Image Capturing Apparatus

Hereinafter, a second exemplary embodiment will be described. FIG. 5 is a block diagram illustrating an example of a functional configuration of a digital camera 110 as an example of the image capturing apparatus according to the present exemplary embodiment of the disclosure.

In FIG. 5, same reference numerals are applied to the components similar to those illustrated in FIG. 1, and description thereof will be omitted. The digital camera 110 of the present exemplary embodiment includes an in-focus area specification unit 21 instead of the face detection unit 20 in FIG. 1, and further includes an operation unit 35.

The digital camera 100 according to the first exemplary embodiment automatically sets a focus frame based on a face area. On the contrary, the digital camera 110 according to the present exemplary embodiment differs from the digital camera 100 according to the first exemplary embodiment in that the digital camera 110 allows a user to specify the focus frame.

As described above, a problem such as deviation between the area indicated by the displayed focus frame and the area in the image data used for in-focus control, which is caused by optical distortion, occurs regardless of whether the focus frame is determined based on the face area. Then, the aspect of the embodiments is also applicable to a digital camera which allows the user to specify the focus frame.

The digital camera 110 of the present exemplary embodiment includes an operation unit 35 for allowing the user to input an instruction to the digital camera 110, and the operation unit 35 includes input devices such as a switch, a button, a dial, a touch panel, and a joystick.

Setting Operation of Focus Frame

Figure 9:
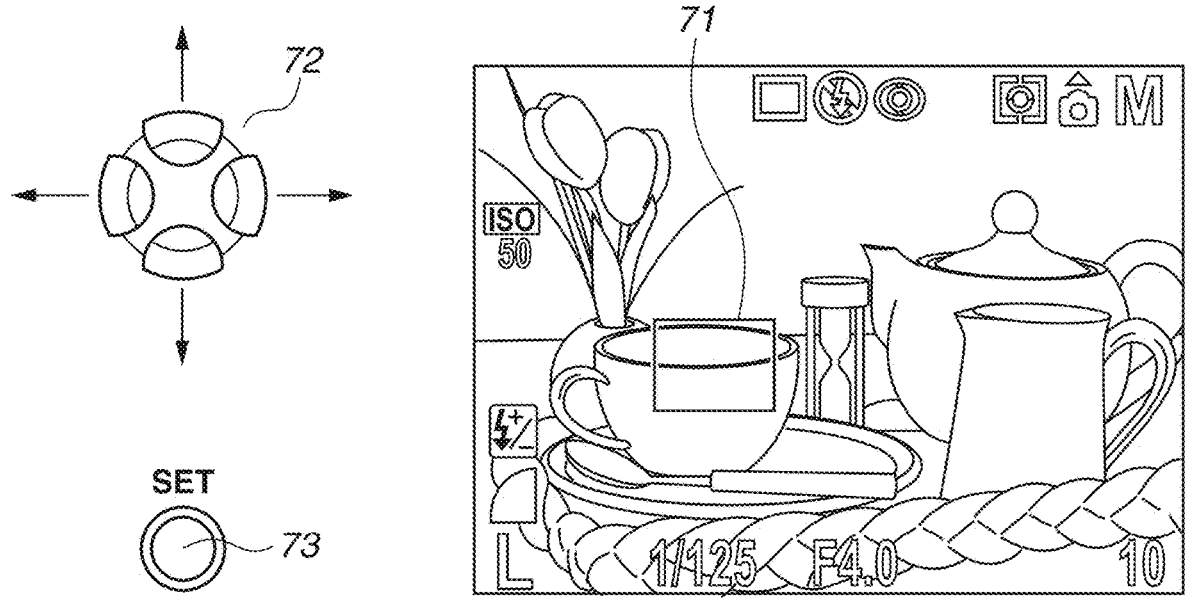
FIG. 9 is a diagram illustrating a setting operation of a focus frame in the digital camera according to the second exemplary embodiment.

FIG. 9 is a diagram illustrating a setting operation of the focus frame executed by the digital camera 110 according to the present exemplary embodiment.

The operation unit 35 includes a direction key 72 and a set button 73. The user can move a focus frame 71 in a display screen to a desired position by operating the direction key 72, and can specify a position of the focus frame 71 by pressing the set button 73. Herein, although the exemplary embodiment has been described with respect to the case where one focus frame 71 is set in the display screen, the number of focus frames 71 to be internally calculated by the camera or sizes of respective frames may be settable within a certain range.

Setting of Arrangement Interval of In-Focus Control Area

The operation executed on the operation unit 35 is input to the in-focus area specification unit 21, and information about a position of the focus frame and the number of set focus frames when the set button 73 is pressed is input to the reference coordinate specification unit 25. Thereafter, the two reference coordinates are input to the reverse distortion correction unit 26.

Figure 15:
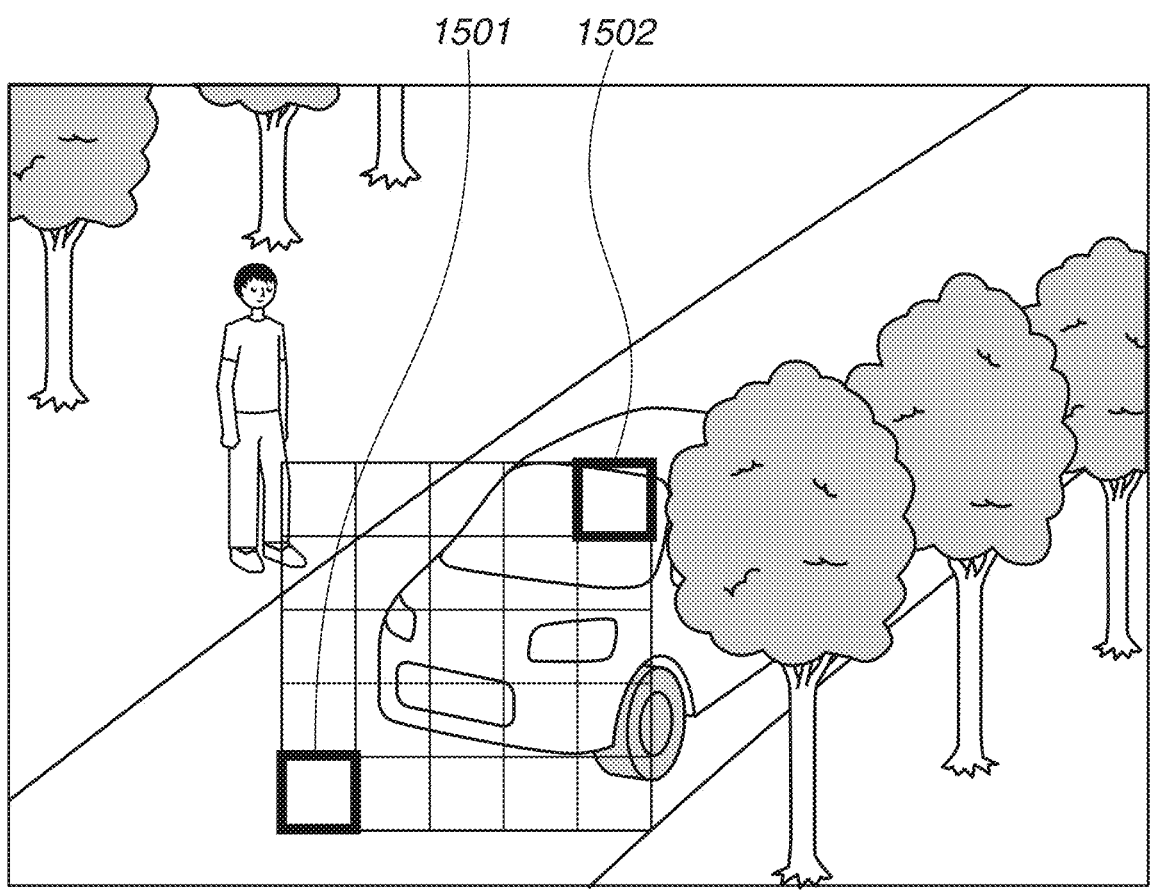
FIG. 15 is a diagram illustrating examples of a display image, a user-specified central position of a focus frame, and reference points in a case where optical distortion is not ignorable.
Figure 16:
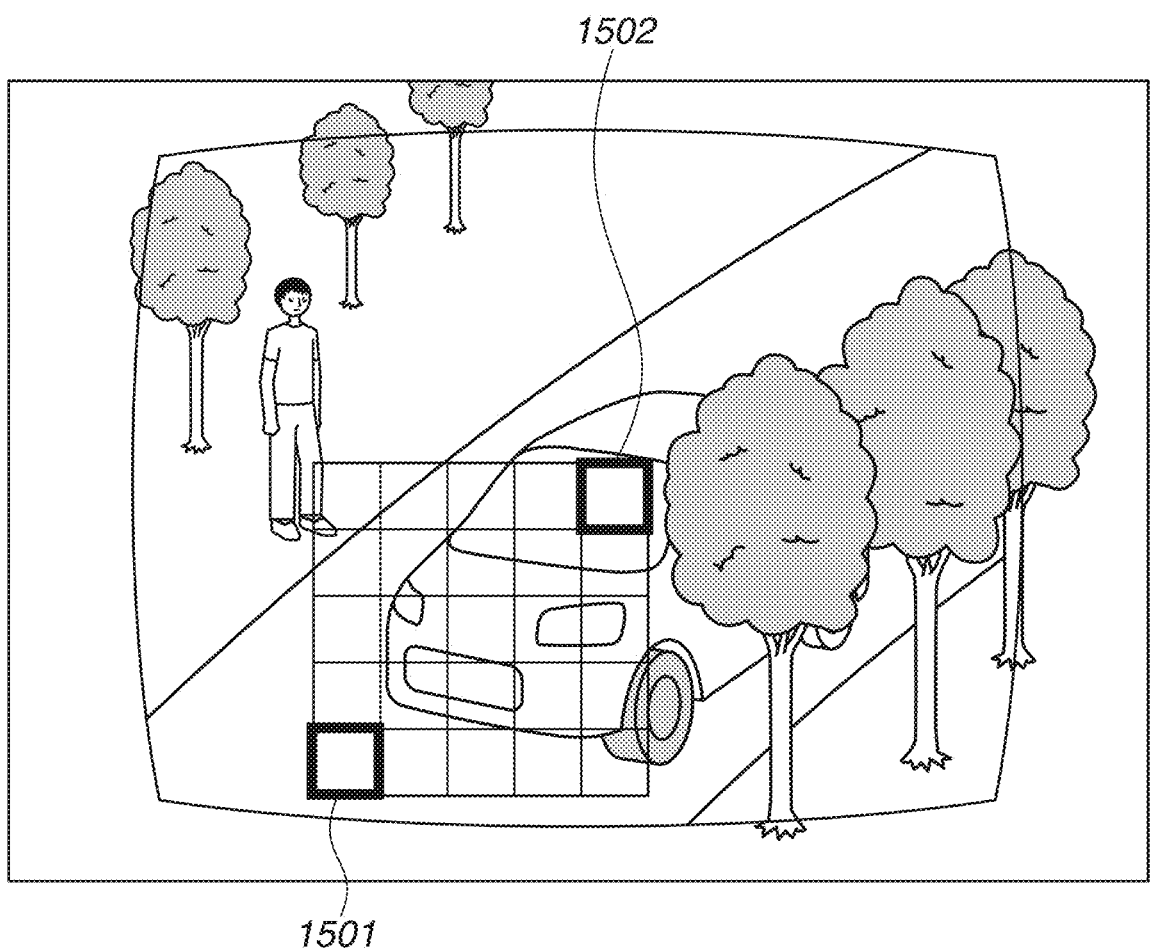
FIG. 16 is a diagram illustrating an arrangement relationship between reference points and in-focus control areas in a captured image in a case where optical distortion is not ignorable.

Each of FIGS. 15 and 16 is a diagram illustrating a central position of the focus frame specified by the user and an arrangement area indicated by the five-by-five focus frames. A point where a distortion amount is the maximum and a point where a distortion amount in an opposite direction is the maximum are set as reference points 1501 and 1502, and the in-focus control areas are arranged on the captured image as illustrated in FIG. 16.

Similar to the first exemplary embodiment, the reverse distortion correction unit 26 acquires a corresponding area of the focus frame in the captured image data before distortion correction, and provides information about the corresponding area to the focus detection area specification unit 28. After that, the processing similar to the processing in the first exemplary embodiment is executed, so that in-focus control is executed on the in-focus control areas.

As described above, regardless of presence or absence of the optical distortion, the arrangement intervals in the in-focus control areas are simply determined based on the positions and the number of focus frames that the user has specified on the corrected image data by the operation unit according to the present exemplary embodiment. With this configuration, in-focus control and display processing can be executed according to the intention of the user while achieving both of reduction in deviation between the focus frame and the in-focus control area and maintenance of the real-time display characteristic.

Other Exemplary Embodiments

The aspect of the embodiments can be realized by processing in which a program for realizing one or more functions according to the above-described exemplary embodiments is supplied to a system or an apparatus via a network or a storage medium, and one or more processors in the system or the apparatus read and execute the program. Further, the aspect of the embodiments can be also realized by a circuit (e.g., application specific integrated circuit (ASIC)) that realizes one or more functions.

Further, in the above-described exemplary embodiment, although the disclosure is applied to a digital camera including a detachable lens, the exemplary embodiment is not limited thereto. In other words, the disclosure can be applied to various types of apparatuses including an image sensor. The disclosure is also applicable to a type of digital camera including a non-interchangeable lens or a video camera. Further, the disclosure is applicable to apparatuses capable of capturing images, e.g., a mobile phone terminal, a mobile type image viewer, a television set including a camera, a digital photo frame, a music player, a game machine, and an electronic book reader.

Further, in the above-described exemplary embodiments, a contrast detection AF method in which focus detection is executed based on contrast information of an object has been described as an example of the AF method. However, the AF method is not limited thereto. For example, the aspect of the embodiments is also applicable to an image plane phase difference AF method using an image sensor including a plurality of pixels and capable of outputting a pair of focus detection signals by photoelectrically converting light beams passing through different pupil areas of an imaging optical system. Further, the aspect of the embodiments is applicable to an image plane phase difference AF method using an image sensor including micro lenses arrayed in a two-dimensional state, each of which includes a plurality of photoelectric conversion elements. Furthermore, the aspect of the embodiments is also applicable to focus detection employing a depth-from-defocus (DFD) method.

In a case where the face area is detected (first exemplary embodiment) or the focus frame is specified (second exemplary embodiment) in an area where an amount of optical distortion is large, a corresponding area in captured image data eventually acquired by the reverse distortion correction unit 26 performing reverse correction will be distorted remarkably. Then, the in-focus control accuracy in the area having a large amount of distortion will be lower than the in-focus control accuracy in the area having a small amount of distortion. Therefore, for example, in a case where in-focus control is executed on a plurality of in-focus control areas when a plurality of face areas is detected or a plurality of focus frames is specified, a priority level of an in-focus control area having a large amount of distortion can be lowered, or, such an in-focus control area may not even be used depending on the circumstances. In other words, the in-focus control area having a small amount of distortion is used.

It is known that optical distortion becomes greater when a view angle is greater (wider) or when an image forming position is closer to a peripheral portion in an object image. Accordingly, for example, if a view angle of the optical system 2 is a predetermined view angle or more, and a detected position of the face area (or a position of the specified focus frame) is located closer to a peripheral portion in an object image than a predetermined position in the screen, it is determined that distortion occurring in that face area is large.

Specifically, for example, the reverse distortion correction unit 26 acquires the view angle of the optical system 2 as the lens information. Then, based on a value of the view angle and the face area information detected by the face detection unit 20 (first exemplary embodiment) or the position information of the focus frame specified by the in-focus area specification unit 21 (second exemplary embodiment), the reverse distortion correction unit 26 serving as a determination unit determines whether the area is included within the area having a large amount of optical distortion. Then, if the area is included within the area having a large amount of distortion, the reverse distortion correction unit 26 can determine not to execute the reverse correction processing itself. Alternatively, the reverse distortion correction unit 26 attaches a flag indicating that distortion is large in the area to the acquired area information, and outputs the area information to the focus detection area specification unit 28. The focus detection area specification unit 28 then does not specify the area having a large amount of distortion as the in-focus control area, or applies a priority or a weight lower than that of the area having a small amount of distortion. The focus evaluation value acquisition unit 30 acquires the evaluation value for each of the in-focus control areas, applies a weight thereto, and outputs the weighted evaluation value to the in-focus control unit 32.

The in-focus accuracy can be improved by weighting an in-focus control area having a small amount of distortion and executing in-focus control on the weighted in-focus control area. Further, if the in-focus control area having a large amount of distortion is not used, a load of the in-focus control processing can be reduced.

According to the above-described exemplary embodiments, it is possible to provide an image capturing apparatus capable of executing focus detection with high accuracy even in a case where distortion occurs in a captured image.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-102879, filed May 31, 2019, which is hereby incorporated by reference herein in its entirety.

What is claimed is:

1. An apparatus comprising:
a sensor that periodically outputs an image obtained by converting light entering through an optical system into an image signal; and
one or more processors which function as;
a correction unit configured to correct optical distortion caused by the optical system reflected on image data before correction acquired from the image signal and outputs corrected image data;
a setting unit configured to set focus frames for detecting an in-focus state of the optical system based on the corrected image data;
a specification unit configured to specify a number of in-focus control areas and arrangement of the in-focus control areas with respect to the image data before correction according to the setting executed by the setting unit; and
a detection unit configured to detect an in-focus state of the optical system based on an image signal of an area specified by the specification unit,
wherein the specification unit further includes a selection unit configured to select only two focus frames from the set focus frames, one of the only two focus frames being a focus frame having a maximum distortion amount among the set focus frames, an other of the only two focus frames being a focus frame set as a reference point for the set focus frames, and determines arrangement intervals of the in-focus control areas based on frame position on the image data before correction corresponding to the selected focus frames and the number of in-focus control areas, and
wherein the frame position on the image data before correction is acquired by executing a reverse processing to a distortion correction processing based on distortion amount at the only two focus frames.

2. The apparatus according to claim 1, wherein the setting unit sets the focus frame with a face position as the reference point.

3. The apparatus according to claim 1, further comprising an operation unit configured to allow a user to input an instruction to the apparatus, wherein the setting unit sets the focus frame based on the instruction input via the operation unit.

4. The apparatus according to claim 1, wherein, in a case where a plurality of focus frames is set, the detection unit detects an in-focus state of the optical system by using an image signal of an area corresponding to a focus frame set at a position where optical distortion caused by the optical system is small from among the plurality of focus frames.

5. A method of an apparatus including a capturing unit configured to convert an object image formed by an optical system into an image signal, the method comprising:
   correcting optical distortion caused by the optical system reflected on image data before correction acquired from the image signal and outputting corrected image data;
   setting focus frames for detecting an in-focus state of the optical system based on the corrected image data;
   specifying a number of in-focus control areas and arrangement of the in-focus control areas with respect to the image data before correction according to the setting; and
   detecting an in-focus state of the optical system based on an image signal of an area specified by the specifying,
   wherein the specifying further includes selecting only two focus frames from the set focus frames, one of the only two focus frames being a focus frame having a maximum distortion amount among the set focus frames, an other of the only two focus frames being a focus frame set as a reference point for the set focus frames, and determining arrangement intervals of the in-focus control areas based on frame position on the image data before correction corresponding to the selected focus frames and the number of in-focus control areas, and
   wherein the frame position on the image data before correction is acquired by executing a reverse processing to a distortion correction processing based on distortion amount at the only two focus frames.

6. The method according to claim 5, wherein the setting sets the focus frame with a face position as the referenced point.

7. The method according to claim 5, further comprising allowing a user to input an instruction to the apparatus,
   wherein the setting sets the focus frame based on the instruction input.

8. The method according to claim 5, wherein, in a case where a plurality of focus frames is set, the detecting detects an in-focus state of the optical system by using an image signal of an area corresponding to a focus frame set at a position where optical distortion caused by the optical system is small from among the plurality of focus frames.

9. A non-transitory computer-readable recording medium that records a control program for executing a method of an apparatus including a capturing unit configured to convert an object image formed by an optical system into an image signal, the method comprising:
   correcting optical distortion caused by the optical system reflected on image data before correction acquired from the image signal and outputting corrected image data;
   setting focus frames for detecting an in-focus state of the optical system based on the corrected image data;
   specifying a number of in-focus control areas and arrangement of the in-focus control areas with respect to the image data before correction according to the setting; and
   detecting an in-focus state of the optical system based on an image signal of an area specified by the specifying,
   wherein the specifying further includes selecting only two focus frames from the set focus frames, one of the only two focus frames being a focus frame having a maximum distortion amount among the set focus frames, an other of the only two focus frames being a focus frame set as a reference point for the set focus frames, and determining arrangement intervals of the in-focus control areas based on frame position on the image data before correction corresponding to the selected focus frames and the number of in-focus control areas, and
   wherein the frame position on the image data before correction is acquired by executing a reverse processing to a distortion correction processing based on distortion amount at the only two focus frames.

10. The non-transitory computer-readable recording medium according to claim 9, wherein the setting sets the focus frame with a face position as the reference point information.

11. The non-transitory computer-readable recording medium according to claim 9, further comprising allowing a user to input an instruction to the apparatus,
    wherein the setting sets the focus frame based on the instruction input.

12. The non-transitory computer-readable recording medium according to claim 9, wherein, in a case where a plurality of focus frames is set, the detecting detects an in-focus state of the optical system by using an image signal of an area corresponding to a focus frame set at a position where optical distortion caused by the optical system is small from among the plurality of focus frames.

* * * * *